United States Patent [19]

Dhein et al.

[11] 4,456,729

[45] Jun. 26, 1984

[54] BINDERS FOR AQUEOUS STOVING LACQUERS BASED ON POLYESTERS AND A PROCESS FOR THE PRODUCTION THEREOF

[75] Inventors: Rolf Dhein, Krefeld; Lothar Bäcker, Dormagen; Jochen Schoeps, Krefeld, all of Fed. Rep. of Germany

[73] Assignee: Bayer Aktiengesellschaft, Leverkusen, Fed. Rep. of Germany

[21] Appl. No.: 448,731

[22] Filed: Dec. 10, 1982

[30] Foreign Application Priority Data

Dec. 24, 1981 [DE] Fed. Rep. of Germany ....... 3151366

[51] Int. Cl.³ .................. C08L 61/20; C08L 67/02; C09D 3/50; C09D 3/66
[52] U.S. Cl. ............................. 524/542; 524/539
[58] Field of Search ................... 524/542, 539

[56] References Cited

U.S. PATENT DOCUMENTS

| | | | |
|---|---|---|---|
| 3,538,034 | 11/1970 | Gress et al. | 524/542 |
| 4,031,052 | 6/1977 | Dhein et al. | 524/539 |
| 4,122,055 | 10/1978 | Tugukuni et al | 524/539 |

FOREIGN PATENT DOCUMENTS

EP62866 10/1982 European Pat. Off. .
3115071 10/1982 Fed. Rep. of Germany .

*Primary Examiner*—Ronald W. Griffin
*Attorney, Agent, or Firm*—Connolly and Hutz

[57] ABSTRACT

By adding reaction products of from 4- to 6-hydric alcohols and dicarboxylic acid anhydrides, it is possible to render originally water-insoluble polyesters dilutable with water. Stoving lacquers based on such systems give highly weather-resistant lacquer films.

8 Claims, No Drawings

BINDERS FOR AQUEOUS STOVING LACQUERS BASED ON POLYESTERS AND A PROCESS FOR THE PRODUCTION THEREOF

This invention relates to binders for aqueous stoving lacquers of polyesters, hydroxyl compounds and, optionally, aminoplast resins and to a process for the production thereof.

Reactive diluents are low-viscosity substances which dilute resin-like binders and, in doing so, impart to the lacquer the viscosity required for application, contain functional groups capable of copolymerisation or cocondensation with the lacquer resin and, for the most part (depending on the volatility thereof), become part of the lacquer film during the hardening process.

Polyester stoving lacquers containing reactive diluents are known (DE-OS Nos. 2,253,300; 2,433,489; 2,439,548 and 2,505,246). Providing the lacquers are aqueous lacquers, the polyesters are reacted with dicarboxylic acid anhydrides to form the semi-esters thereof, the free carboxyl groups providing the polyester, after neutralisation, with the required dilutability with water. If a clear lacquer rather than a cloudy dispersion is to be obtained, it is still advisable to use water-miscible organic auxiliary solvent because it is only by so doing that clouding may be safely avoided.

On the other hand, in cases where, for example, polyols, such as glycerol, are used as reactive diluents, the hardened lacquer film is in danger of undergoing an increase in its hydrophilicity through an increase in the number of free hydroxyl groups in the binder, resulting in an undesirable deterioration in the quality of the lacquer films, for example in the form of a reduction in gloss or poorer weather resistance. Although such a phenomenon may be overcome by increasing the percentage of cross-linking agent, a reduction in the elasticity of the film is the inevitable outcome of such a measure.

It has now surprisingly been found that the use of optionally neutralised reaction products of dicarboxylic acid anhydrides and from 4- to 6-hydric alcohols in the absence of inert organic solvents with basically water-insoluble polyesters leads to non-cloudy aqueous lacquers. Irrespective of wheather the polyesters used are soluble or insoluble in water, the reaction products used in accordance with the present invention provide the stoving lacquers, after application, with extremely high weather resistance and high gloss.

Accordingly, the present invention relates to aqueous stoving lacquers based on:
(A) from 40 to 90, preferably from 60 to 80, parts, by weight, of one or more polyesters having an acid number of from 1 to 100, preferably from 5 to 50, more preferably from 5 to 20, a hydroxyl number of from 40 to 400 and an average molecular weight of from 1500 to 10,000;
(B) from 10 to 60, preferably from 20 to 40, parts, by weight, of one or more hydroxyl compounds having an average molecular weight below 1000; and
(C) from 10 to 40 parts, by weight, of one or more aminoplast resins;
characterised in that the hydroxyl component (B) is a reaction product of at least one dicarboxylic acid anhydride and at least one from 4- to 6-hydric alcohol, the reaction product containing from 1.0 to 1.3, preferably from 1.0 to 1.1, moles of dicarboxylic acid radicals per polyol radical.

The polyester component (A) and the hydroxyl component (B) are combined with stirring at elevated temperature. If stirring is continued for a prolonged period, a marked reduction in viscosity is observed with increasing solubility in water of the combination of polyester component (A) and hydroxyl component (B). The maximum solubility in water is reached when there is no further reduction in viscosity.

Accordingly, the present invention also relates to a process for the production of stoving lacquers from:
(A) from 40 to 90, preferably from 60 to 80, parts, by weight, of one or more polyesters having an acid number of from 1 to 100, preferably from 5 to 50, more preferably from 5 to 20, a hydroxyl number of from 40 to 400 and an average molecular weight of from 1500 to 10,000;
(B) from 10 to 60, preferably from 20 to 40, parts, by weight, of one or more hydroxyl compounds having an average molecular weight below 1000; and
(C) from 10 to 40 parts, by weight, of one or more aminoplast resins; characterised in that the hydroxyl component (B) is a reaction product of at least one dicarboxylic acid anhydride and at least one from 4- to 6-hydric alcohol, the reaction product containing from 1.0 to 1.3, preferably from 1.0 to 1.1, moles of dicarboxylic acid radicals per polyol radical, and in that the polyester component (A) is combined with the hydroxyl component (B) at from 110° to 150° C., preferably from 120° to 140° C., and stirred until the required viscosity is reached, followed by neutralisation and addition of the aminoplast resin component (C).

The hydroxyl component (B) may also be produced without disadvantage from dicarboxylic acid anhydride and polyol in the presence of the polyester (A).

In the context of the present invention, polyesters (A) are to be understood to be oil-free and also fatty acid-modified polycondensates produced from alcohols and carboxylic acids by polycondensation in known manner, of the type described, for example, in Rompp's Chemielexikon, Vol. 1, page 202, Frankh'sche Verlagsbuchhandlung, Stuttgart, 1966, or in D. H. Solomon, The Chemistry of Organic Filmformers, pages 75–101, John Wiley and Sons Inc., New York, 1967.

Preferred alcohols for the synthesis of the polyesters (A) are aliphatic, cycloaliphatic and/or araliphatic alcohols containing from 1 to 6, preferably from 1 to 4 OH groups attached to non-aromatic carbon atoms and from 1 to 24 carbon atoms per molecule, for example glycols, such as ethylene glycol, propylene glycol, butane diols, neopentyl glycol, hexane diols; ether alcohols, such as diethylene and triethylene glycols, and also dianhydro-sorbitol and dianhydro-mannitol; ethoxylated bisphenols; perhydrogenated bisphenols; also trimethylolethane, trimethylolpropane, glycerol, pentaerythritol, dipentaerythritol, mannitol and sorbitol; monohydric chain-terminating alcohols, such as propanol, butanol, cyclohexanol and benzyl alcohol.

Preferred acid components for the synthesis of the polyesters (A) are aliphatic, cycloaliphatic, saturated or unsaturated and/or aromatic polybasic carboxylic acids, preferably di- and tri-carboxylic acids, containing from 4 to 12 carbon atoms per molecule of esterifiable derivatives thereof (for example anhydrides or esters), for example phthalic acid anhydride, isophthalic acid, terephthalic acid, tetrahydro- and hexahydrophthalic acid, anhydride, trimellitic acid anhydride, pyromellitic acid anhydride, maleic acid anhydride, fumaric acid, adipic acid, sebacic acid, glutaric acid and succinic acid anhydride, azelaic acid, endomethylene tetrahydrophthalic acid, also halogenated acids, such as 3,4,5,6-tetrachlorophthalic acid and hexachloroendomethylene tetrahydrophthalic acid.

Preferred monocarboxylic acids for the production of the polyesters (A) are aliphatic, cycloaliphatic, saturated and unsaturated and/or aromatic monocarboxylic acids containing from 6 to 24 carbon atoms per molecule, such as benzoic acid, butyl benzoic acid, tolylic acid, hexahydrobenzoic acid, abietic acid, lactic acid and also fatty acids and esters thereof, such as linseed oil, soya oil, wood oil, sunflower oil, safflower oil, castor oil, ricinene oil, cottonseed oil, peanut oil, oiticica oil, tall oil fatty acid, linseed oil fatty acid, soya oil fatty acid, wood oil fatty acid, sunflower oil fatty acid, oiticica oil fatty acid, safflower oil fatty acid and ricinene oil fatty acid and products obtained from natural, unsaturated oils or fatty acids by conjugation or isomerisation; suitable saturated fatty acids are, for example, coconut oil fatty acid and α-ethyl hexanoic acid, also isotridecanoic acid.

Preferred dicarboxylic acid anhydrides for the production of the hydroxyl component (B) are phthalic acid anhydride, maleic acid anhydride, succinic acid anhydride, tetrahydro- and hexahydro-phthalic acid anhydride.

Preferred from 4- to 6-hydric alcohols for the production of the hydroxyl compound (B) are polyols containing from 5 to 10 carbon atoms, such as adonitol, arabitol, xylitol, dulcitol, iditol, dipentaerythritol, but particularly sorbitol, mannitol and pentaerythritol.

The average molecular weights of the polyesters (A) and the hydroxyl component (B) are determined by osmoetry in dimethyl formamide.

Particularly preferred hydroxyl components (B) are those which have been produced from equimolar quantities of dicarboxylic acid anhydride and polyol. Up to 100% of the hydroxyl components (B) consist of the dicarboxylic acid monoester of the polyol used.

The total acid number of the combination of (A) and (B) is generally from 40 to 60.

Preferred aminoplast resins (C) are water-soluble melamine/formaldehyde or urea/formaldehyde condensation products. Melamine resins are any conventional non-etherified melamine/formaldehyde condensates or melamine/formaldehyde condensates etherified with saturated mono-hydric alcohols containing from 1 to 4 carbon atoms, of the type described, for example in FR-PS No. 943,411 or in D. H. Solomon, The Chemistry of Organic Filmformers, 235–240, John Wiley & Sons. Inc., New York, 1967. However, the melamine resins may also be completely or partly replaced by other cross-linking aminoplasts of the type described, for example, in "Methoden der Organischen Chemie" (Houben-Weyl), Vol. 14/2, part 2, 4th Edition, Georg Thieme Verlag, Stuttgart, 1963, 319 et seq.

Preferred neutralising agents are alkali metal hydroxides, ammonia, primary, secondary and tertiary amines, such as ethylamine, di- and tri-ethylamine, mono-, di- and tri-ethanolamine, dimethylethanolamine, methyl diethanolamine, dimethylaminomethyl propanol.

The stoving lacquers according to the present invention may contain pigments, such as titanium dioxide, iron oxide, chromium oxide, zinc sulphide, carbon black, aluminium bronze, fillers, such as silica, and lacquer auxiliaries, such as levelling agents.

The lacquers may be applied by the conventional methods, such as dip coating, spray coating, casting, spread-coating.

The lacquers ready for spraying preferably have water contents of from 20 to 50%, by weight, based on the sum of all the lacquer components.

Hardening may be carried out at temperatures of from 80° to 230° C.

The parts quoted in the following Examples are parts, by weight.

EXAMPLES

Production of a polyester A 551 parts of propylene glycol, 369.5 parts of trimethylolpropane, 747.3 parts of adipic acid and 506.2 parts of phthalic acid anhydride are condensed at 230° C. under an inert gas atmosphere until a viscosity corresponding to a flow-out time of 150 seconds (as measured on a 60%, by weight, solution in dimethyl formamide in accordance with DIN 53 211) is reached. The acid number of the polyester A mounts to ~10.

EXAMPLE 1

192.8 parts of polyester A and 85.8 parts of a mixture of equimolar quantities of sorbitol and tetrahydrophthalic acid anhydride are combined at 130° C. under an inert gas atmosphere. A viscosity corresponding to a flow-out time of 50 seconds (as measured on a 60%, by weight, solution in dimethyl formamide in accordance with DIN 53 211) is reached after 40 hours at 130° C. The product formed has an acid number of ~55.

25 parts of the thus-obtained product are processed with 2.26 parts of N,N-dimethylethanolamine, 10.41 parts of methylated methylol melamine resin in the form of an 80%, by weight, solution in isopropanol, 26.67 parts of titanium dioxide, 0.10 part of levelling agent and 43.06 parts of water to form a sprayable lacquer having a pH of 7.7, a viscosity corresponding to a flow-out time of 50 seconds (as measured in accordance with DIN 53 211) and a solids content of 55.8%, by weight, (determined by heating for 1 hour to 120° C.).

The lacquer was sprayed and stoved for 30 minutes at 120° C. (dry film thickness from 30 to 35 μm). The lacquer finishes obtained are distinguished by minimal chalking and a high weather resistance.

EXAMPLE 2

192.8 parts of polyester A are reacted with 74 parts of the reaction product of equimolar quantities of phthalic acid anhydride and pentaerythritol under an inert gas atmosphere at 130° C. A viscosity corresponding to a flow-out time of 50 seconds (as measured on a 60%, by weight, solution in dimethyl formamide in accordance with DIN 53 211) is reached after 20 hours at 130° C. The product formed has a total acid number of 50.

25 parts of the thus-obtained product are processed with 1.88 parts of N,N-dimethylethanolamine, 10.41 parts of methylated methylol melamine resin in the form of an 80%, by weight, solution in isopropanol, 26.67 parts of titanium dioxide, 0.10 part of levelling agent and 35.94 parts of water to form a cover lacquer which gives hard, high-gloss lacquer films.

We claim:
1. Aqueous stoving lacquers based on:
   (A) from 40 to 90 parts, by weight, of one or more polyesters having an acid number of from 1 to 100, a hydroxyl number of from 40 to 400 and an average molecular weight of from 1,500 to 10,000;

(B) from 10 to 60 parts, by weight, of one or more hydroxyl compounds having an average molecular weight of below 1,000; and (C) from 10 to 40 parts, by weight, of one or more aminoplast resins;

wherein the hydroxyl component (B) is a reaction product of at least one dicarboxylic acid anhydride and at least one from 4- and 6-hydric alcohol, the reaction product containing from 1.0 to 1.3 moles of dicarboxylic acid radicals per polyol radical.

2. Stoving lacquers as claimed in claim 1 based on:
from 60 to 80 parts, by weight, of (A);
from 20 to 40 parts, by weight, of (B); and
from 10 to 40 parts, by weight of (C).

3. Stoving lacquers as claimed in claim 1, wherein the polyester component (A) has an acid number of from 5 to 50.

4. Stoving lacquers as claimed in claim 1, wherein the polyester component (A) has an acid number of from 5 to 20.

5. Stoving lacquers as claimed in claim 1, wherein the hydroxyl component (B) contains from 1.0 to 1.1 mole of dicarboxylic acid radicals per polyol radical.

6. Stoving lacquers as claimed in claim 1, wherein the hydroxyl component (B) is a phthalic acid, maleic acid, succinic acid, tetrahydro- and/or hexahydro-phthalic acid semi-ester.

7. Stoving lacquers as claimed in claim 1, wherein the hydroxyl component (B) is a mannitol, sorbitol and/or pentaerythritol ester.

8. A process for the production of stoving lacquers from (A) from 40 to 90 parts, by weight, of polyesters having an acid number of from 1 to 100, a hydroxyl number of from 40 to 400 and an average molecular weight of from 1,500 to 10,000;

(B) from 10 to 60 parts, by weight, of a hydroxyl compound having an average molecular weight below 1,000; and (C) from 10 to 40 parts, by weight, of an aminoplast resin;

wherein the hydroxyl component (B) is a reaction product of at least one dicarboxylic acid anhydric and at least one from 4 to 6-hydric alcohol, the reaction product containing from 1.0 to 1.3 moles of dicarboxylic acid radicals per polyol radical and in that polyester component (A) is combined with the hydroxyl component (B) at a temperature of from 110° to 150° C. and stirred until the required viscosity is reached, followed by neutralisation and addition of the aminoplast resin (C).

* * * * *